United States Patent
Murano et al.

(10) Patent No.: US 9,800,045 B2
(45) Date of Patent: Oct. 24, 2017

(54) SYSTEM FOR PREVENTING ARC DISCHARGE GENERATED DURING USE OF DC POWER SUPPLY

(71) Applicant: SION ELECTRIC CO., LTD., Hokkaido (JP)

(72) Inventors: Minoru Murano, Hokkaido (JP); Suminobu Akiba, Hokkaido (JP); Shin Tanahashi, Hokkaido (JP)

(73) Assignee: SION ELECTRIC CO., LTD., Hokkaido (JP)

( * ) Notice: Subject to any disclaimer, the term of this patent is extended or adjusted under 35 U.S.C. 154(b) by 161 days.

(21) Appl. No.: 14/889,681

(22) PCT Filed: Apr. 16, 2014

(86) PCT No.: PCT/JP2014/002155
§ 371 (c)(1),
(2) Date: Nov. 6, 2015

(87) PCT Pub. No.: WO2014/181501
PCT Pub. Date: Nov. 13, 2014

(65) Prior Publication Data
US 2016/0111870 A1   Apr. 21, 2016

(30) Foreign Application Priority Data
May 7, 2013   (JP) .................. 2013-097602

(51) Int. Cl.
*H02H 3/20* (2006.01)
*H02M 3/156* (2006.01)
(Continued)

(52) U.S. Cl.
CPC ............ *H02H 3/202* (2013.01); *H02H 9/002* (2013.01); *H02H 9/005* (2013.01); *H02M 3/156* (2013.01); *H02H 1/0015* (2013.01)

(58) Field of Classification Search
CPC ........ H02H 3/202; H02H 9/005; H02H 9/002; H02H 1/0015; H02H 7/222; H02H 7/26;
(Continued)

(56) References Cited

U.S. PATENT DOCUMENTS 5,485,061 A * 1/1996 Ukita ................. H05B 41/2882
                                                         315/209 R
5,854,729 A * 12/1998 Degeneff ............. H01H 33/596
                                                              361/13
(Continued)

FOREIGN PATENT DOCUMENTS

JP         7-62521     3/1995
JP         2001-45652  2/2001
(Continued)

OTHER PUBLICATIONS

International Search Report dated Aug. 19, 2014 in corresponding International Application No. PCT/JP2014/002155.

*Primary Examiner* — Zeev V Kitov
*Assistant Examiner* — Nicolas Bellido
(74) *Attorney, Agent, or Firm* — Wenderoth, Lind & Ponack, L.L.P.

(57) ABSTRACT

When using DC power supplies, turning off switches and unplugging from sockets can result in arc discharge, and when arc discharge occurs, heat is generated, which can cause damage to contacts, wiring of disconnection points to melt, and fires. In order to solve this problem, an object is to prevent inrush current when connecting a power supply, detect arc discharge generated when disconnecting direct current, and stop arc discharge over a short period of time. All of the loads that are connected to a DC power supply are equipped with a soft-start function that gradually and smoothly increases current so as to prevent current from flowing suddenly when connected to a power supply, and if a sudden drop in the power supply voltage is detected, an arc
(Continued)

discharge is deemed to have occurred, and the flow of current from the power supply to the load is cut off immediately.

3 Claims, 13 Drawing Sheets

(51) Int. Cl.
*H02H 9/00* (2006.01)
*H02H 1/00* (2006.01)

(58) Field of Classification Search
CPC ........... H02H 7/00; H02H 7/22; H02M 3/156; H01H 33/596; H01H 33/14; H01H 33/04; H01H 33/59; H01H 33/006
USPC .......................................... 361/91.1, 4, 13, 3
See application file for complete search history.

(56) References Cited

U.S. PATENT DOCUMENTS

| | | | |
|---|---|---|---|
| 5,942,139 A * | 8/1999 | Moriguchi | B23K 9/0956 219/130.33 |
| 6,115,230 A * | 9/2000 | Voigts | B03C 3/68 361/1 |
| 6,147,477 A * | 11/2000 | Saeki | H02M 1/36 323/273 |
| 6,683,766 B1 * | 1/2004 | Guo | H01H 9/548 361/42 |
| 7,518,839 B2 * | 4/2009 | Chou | H02H 1/0015 361/111 |
| 7,688,556 B2 * | 3/2010 | Cheng | H02H 1/0015 361/2 |
| 9,621,064 B2 * | 4/2017 | Yuzurihara | H02M 5/458 |
| 2004/0246750 A1 * | 12/2004 | Ichikawa | H02M 3/1563 363/21.12 |
| 2005/0007036 A1 * | 1/2005 | Samejima | H02M 1/34 315/291 |
| 2005/0030687 A1 * | 2/2005 | Chou | H02H 7/003 361/91.1 |
| 2005/0067898 A1 | 3/2005 | Gronbach | |

FOREIGN PATENT DOCUMENTS

| | | | |
|---|---|---|---|
| JP | 2005-102496 | | 4/2005 |
| JP | 2007-143338 | | 6/2007 |
| JP | 2007143338 A | * | 6/2007 |
| JP | 2012-243638 | | 12/2012 |
| WO | 2009/133608 | | 11/2009 |

* cited by examiner

EXEMPLARY CONFIGURATION OF ARC DISCHARGE DETECTION CIRCUIT

EXEMPLARY CONFIGURATION OF ARC DISCHARGE DETECTION CIRCUIT

SYSTEM FOR PREVENTING ARC DISCHARGE GENERATED DURING USE OF DC POWER SUPPLY

TECHNICAL FIELD

This invention relates to a power cutoff device in a DC power feeding operation, and more particularly, to a system for preventing an arc discharge generated during use of a DC power supply as one of technologies for safely connecting/disconnecting transmission of high-voltage and large-current DC power.

BACKGROUND ART

In a DC power feeding operation, an arc discharge is generated disadvantageously when an electric switch or outlet is disconnected.

In general, in both DC and AC operations, an arc discharge is generated when power is disconnected. In the case of the AC operation, there is an instant where a voltage changes to zero in every 10 ms if a frequency is set to 50 Hz (refer to FIG. 10). Therefore, the arc discharge stops within 10 ms spontaneously.

In comparison, in the case of the DC operation, there is no instant of the zero voltage. Therefore, the arc discharge does not stop spontaneously.

As an arc discharge is generated, heat may be generated, and an electric contact may be damaged, so that wiring in a disconnection point may be melt to cause a fire. In addition, this may generate light or sound, which may make a user fear or shocked, so that a secondary failure may occur.

For this reason, there have been proposed some electric outlets having a spring switch mechanism or a mechanism capable of suppressing an arc discharge by using a magnetic force. However, in these methods, a structure of the electric outlet becomes complicated, and cost increases. Furthermore, it is difficult to answer a failure such as electric disconnection.

CITATION LIST

Patent Literatures

[Patent Literature 1] JP 2012-243638 A

SUMMARY OF INVENTION

In view of the aforementioned problems, it is therefore an object of this invention to provide a system capable of preventing an inrush current at the time of connection of a power supply and a breakdown of a connected device by detecting an arc discharge generated at the time of DC power disconnection and stopping the arc discharge within a short time to guarantee safety.

According to an aspect of this invention, there is provided an arc discharge prevention system including a DC power supply; and a load connected to the DC power supply, the load having an arc discharge detector unit, a power control unit that cuts off power supplied to the load, and a soft-start control unit that smoothly increases power supplied when the power supply is connected.

That is, according to this invention, overall loads (devices) connected to the DC power supply are provided with a so-called soft start function capable of smoothly and slowly increasing an electric current without an abrupt current flow at the time of connection to the power supply. When an abrupt decrease of the power voltage is detected, it is determined that an arc discharge is generated, and the load (device) is immediately disconnected from the power supply.

According to this invention, it is possible to alleviate adverse effects caused by an inrush current generated when a device is connected to the DC power supply. In addition, it is possible to detect an arc discharge generated at the time of disconnection of the DC power supply and stop the arc discharge within a short time. Therefore, it is possible to prevent a breakdown of the connected device and guarantee safety. Furthermore, even in a failure such as an electric disconnection accident, it is possible to detect an arc discharge generated by the failure and stop the arc discharge within a short time.

DESCRIPTION OF EMBODIMENTS

Embodiments

A description will now be made for embodiments of this invention with reference to the accompanying drawings.

First, it is assumed that any load 2 (device) connected to a DC power supply 1 satisfies the following condition.

(Condition 1) Any load 2 (device) connected to the DC power supply 1 has a (soft start) function for smoothly (slowly) increasing an electric current without abruptly flowing the current when the load 2 is connected to the DC power supply 1. That is, the load 2 is required to have a soft-start control unit 8.

(Condition 2) When an abrupt decrease of the power voltage is detected, it is necessary to immediately disconnect the load (device) from the power supply by determining that an arc discharge is generated. That is, it is required to provide a power control unit 6 capable of cutting off the power supplied to the load 2.

A description will be made for Condition 1 with reference to the drawings.

Figure 1A:
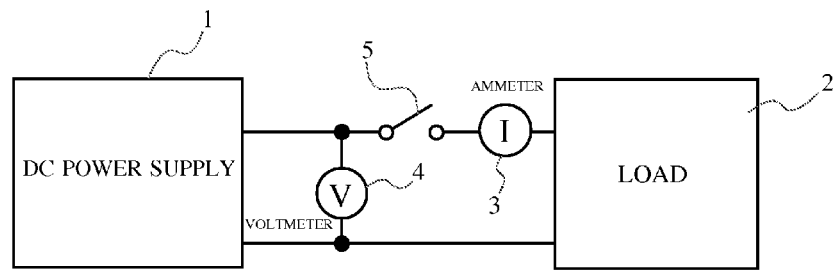
FIG. 1A is an explanatory diagram illustrating a configuration of a DC power supply connected to a load.

First, it is assumed that a load 2 having no soft start function, that is, no soft-start control unit 8 is connected to the DC power supply 1 as illustrated in FIG. 1A.

Here, an ammeter 3 and a voltmeter 4 are connected, and a voltage of the DC power supply 1 and a current of the load 2 are checked.

Figure 1B:
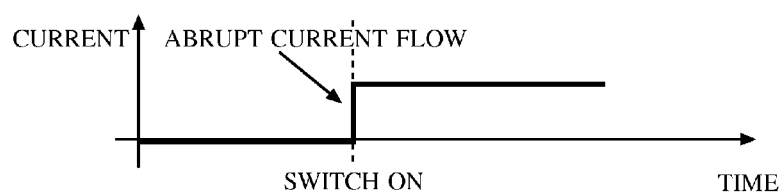
FIG. 1B is an explanatory diagram illustrating a change of the electric current when a switch is turned on in FIG. 1A.
Figure 1C:
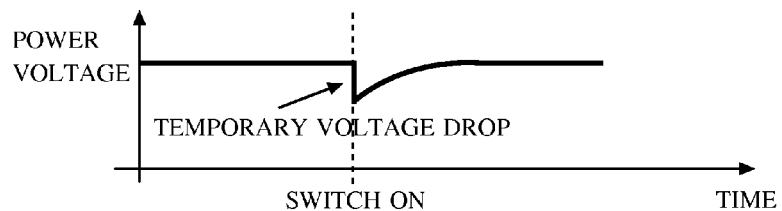
FIG. 1C is an explanatory diagram illustrating a change of a power voltage when the switch is turned on in FIG. 1A.

Typically, as a switch 5 is turned on, or a load 2 is directly connected to the DC power supply 1, an electric current abruptly flows as soon as the switch 5 is turned on as illustrated in FIG. 1B. For this reason, the voltage of the DC power supply 1 abruptly decreases temporarily as the switch 5 is turned on as illustrated in FIG. 1C (note that this depends on a characteristic of the DC power supply 1 although it may vary slightly).

Figure 1D:
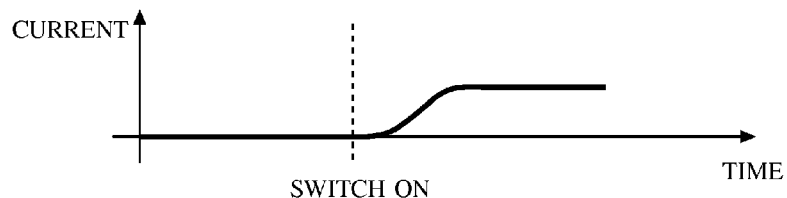
FIG. 1D is an explanatory diagram illustrating a change of the electric current when the switch is turned on by using a load having a soft start function in FIG. 1A.

In this regard, if the load 2 has a soft start function, that is, if the load 2 has the soft-start control unit 8, an electric current flows slowly as illustrated in FIG. 1D.

Figure 1E:
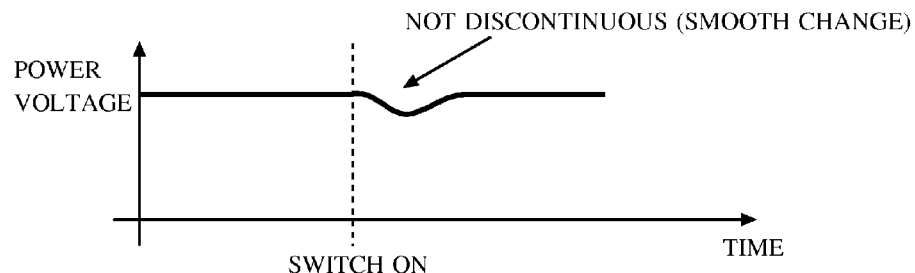
FIG. 1E is an explanatory diagram illustrating a voltage change when the switch is turned on by using a load having a soft start function in FIG. 1A.

Then, the voltage of the DC power supply 1 changes as illustrated in FIG. 1E, so that it is possible to suppress an abrupt voltage drop.

Figure 4:
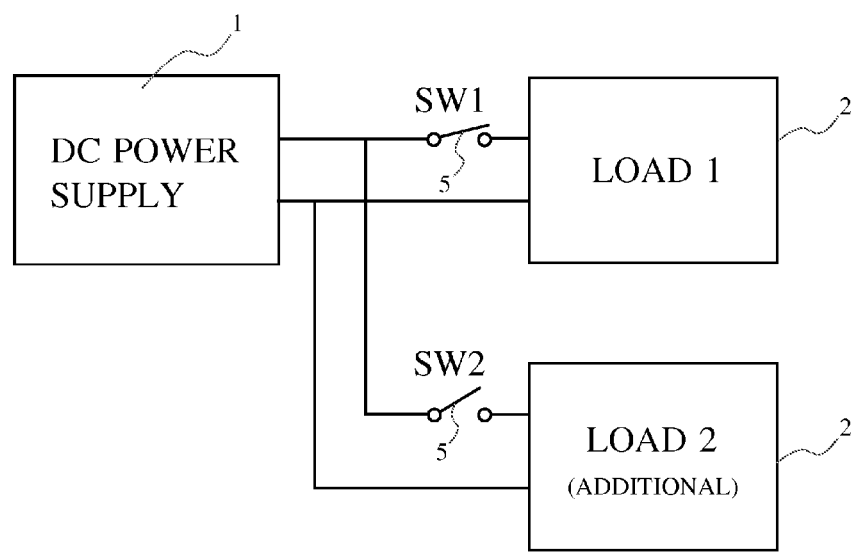
FIG. 4 is an explanatory diagram illustrating a pair of exemplary loads connected to a single DC power supply.
Figure 5A:
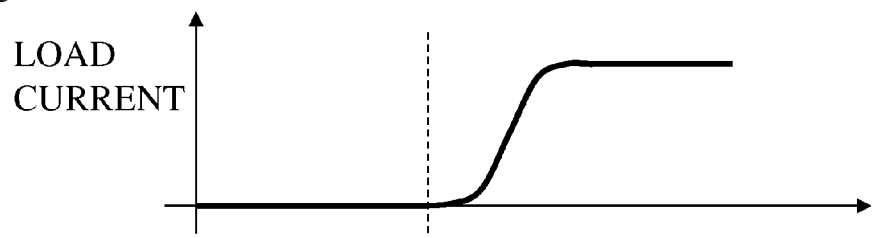
FIG. 5A is an explanatory diagram illustrating a current change in a load, generated by a voltage change other than an arc discharge (by adding the load), when the load having a soft start function is connected.
Figure 5B:
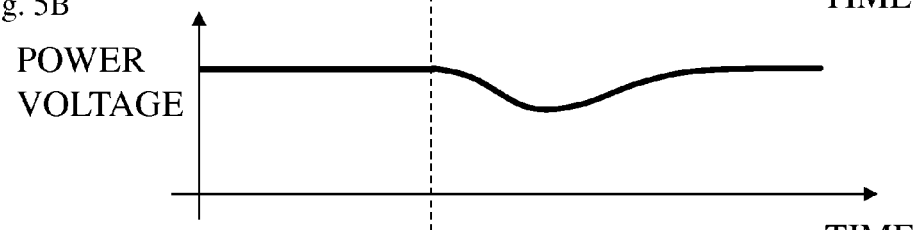
FIG. 5B is an explanatory diagram illustrating a change of the power voltage in a load, generated by a voltage change other than an arc discharge (by adding the load), when the load having a soft start function is connected.
Figure 5C:
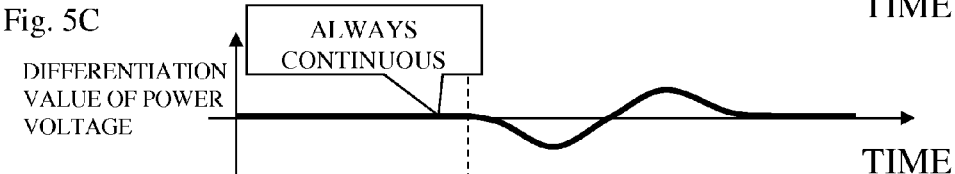
FIG. 5C is an explanatory diagram illustrating a change of a differentiation value of the power voltage in a load, generated by a voltage change other than an arc discharge (by adding the load), when the load having a soft start function is connected.
Figure 5D:
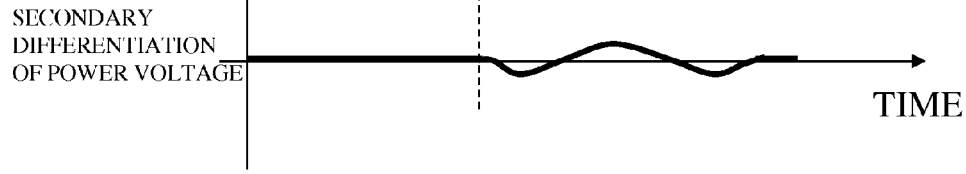
FIG. 5D is an explanatory diagram illustrating a change of a secondary differentiation value of the power voltage in a load, generated by a voltage change other than an arc discharge (by adding the load), when the load having a soft start function is connected.

It is noted that this similarly applies to a case where a plurality of loads 2 are connected to the same DC power supply 1 as illustrated in FIG. 4.

From this fact, it is conceived that an abrupt voltage drop is generated when any part of the current path from the DC power supply 1 to the voltmeter 4 is disconnected although Condition 1 is satisfied (assuming that the DC power supply 1 has no trouble).

Next, Condition 2 will be described.

Figure 2A:
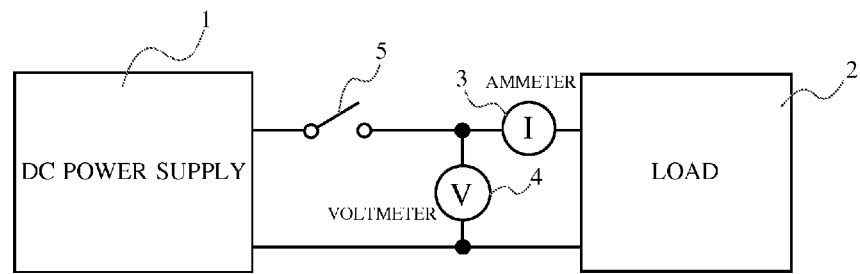
FIG. 2A is an explanatory diagram illustrating a configuration when a load is disconnected.

Assuming that the voltage is checked in the load 2 side, it is conceived that an abrupt voltage drop may be generated when the switch 5 is turned off as illustrated in FIG. 2A, or when any part of the current path from the DC power supply 1 to the voltmeter 4 is disconnected.

For example, when another load 2 is connected to the DC power supply 1, an abrupt voltage drop is not generated as described in relation to Condition 1.

Figure 2B:
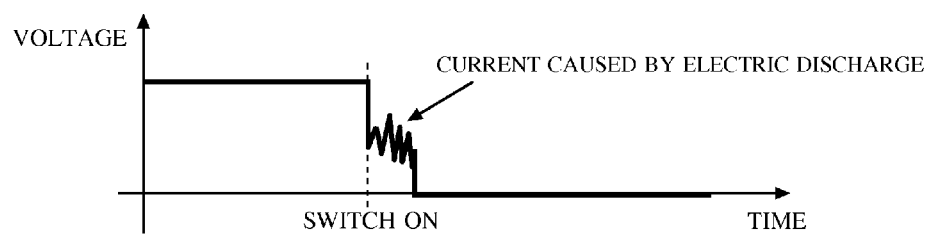
FIG. 2B is an explanatory diagram illustrating a voltage change when an arc discharge is generated by disconnecting the load.

Here, it is desirable that the load 2 is immediately disconnected when an abrupt voltage drop is detected. That is, when an arc discharge is generated, the voltage changes as illustrated in FIG. 2B, so that the current continuously flows in an unstable state until the arc discharge stops. However, this discharge can stop within a short time by disconnecting the load 2.

Figure 7:
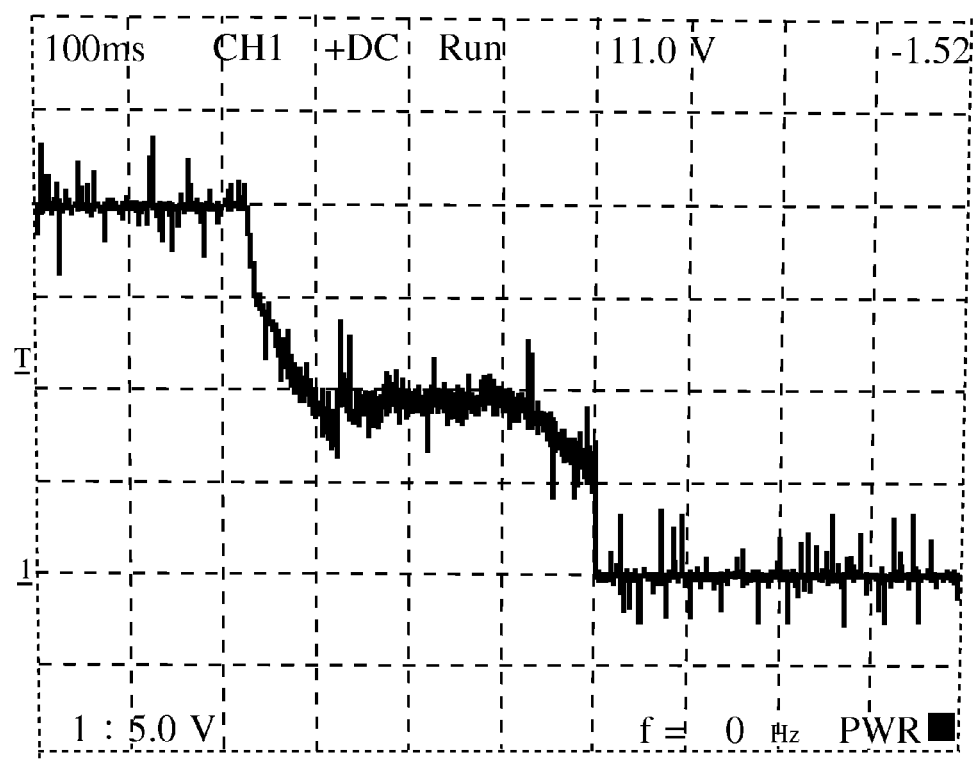
FIG. 7 is an explanatory diagram illustrating a voltage change in a load when an arc discharge is generated actually.

It is noted that FIG. 7 shows a graph of the voltage waveform when an arc discharge is generated in practice.

Figure 2C:
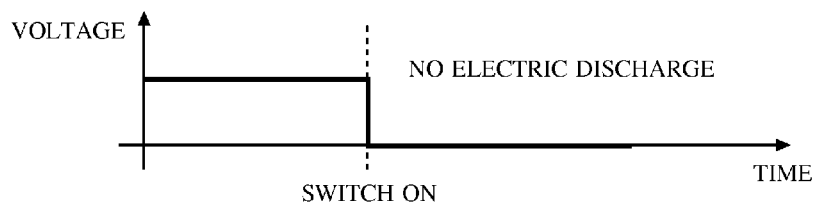
FIG. 2C is an explanatory diagram illustrating a voltage change when no arc discharge is generated by disconnecting the load.

Meanwhile, there may be a case where no arc discharge is generated due to an unknown reason, for example, when the power voltage is low basically. In this case, the voltage changes as illustrated in FIG. 2C, and the voltage becomes zero immediately. Similarly, in this case, there is no trouble by disconnecting the load 2.

As described above, based on Conditions 1 and 2, it is possible to detect an arc discharge and compulsorily stop the arc discharge.

Figure 3A:
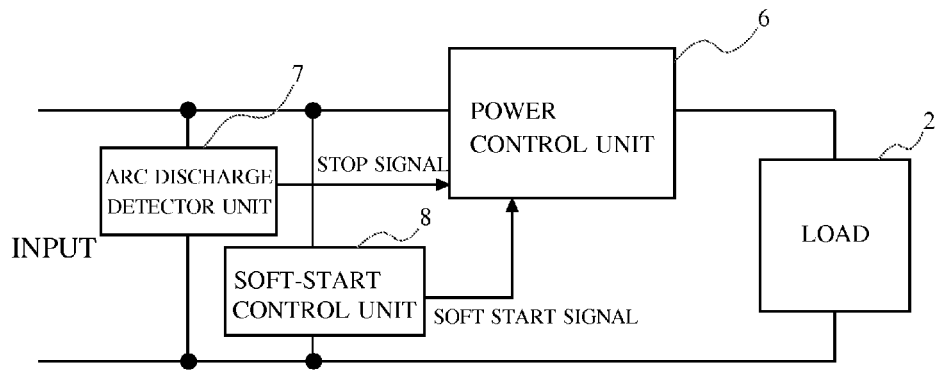
FIG. 3A is an explanatory diagram illustrating an embodiment of this invention.

Next, a description will be made for a configuration for implementing these conditions according to an embodiment of this invention with reference to FIG. 3A.

The power control unit 6 is a device for generating a voltage necessary in the load 2 and may have a PWM chopper circuit and the like.

The arc discharge detector unit 7 transmits a stop signal to the power control unit 6 when an abrupt voltage drop is detected. As the power control unit 6 receives the stop signal, the power output operation is interrupted, and the input from the DC power supply 1 is electrically cut off from the load 2.

As the power is supplied, the soft-start control unit 8 transmits a soft start signal to the power control unit 6. As the power control unit 6 receives the soft start signal, it smoothly increases the electric current until a target power is obtained.

Here, a description will be made for an exemplary configuration of the arc discharge detector unit 7 with reference to FIGS. 3B and 3C.

Several typical methods will be described although various methods may be considered to detect an arc discharge.

Method 1: An arc discharge may be detected by determining a certain threshold voltage and comparing an input voltage and the threshold voltage This method is very simple and easy. However, it is necessary to define the power voltage accurately within a certain range, and it is difficult to discriminate a case where the power voltage drops due to a large load 2 (that is, it is difficult to discriminate between a smooth change and an abrupt change).

Method 2: An arc discharge may be detected by differentiating a voltage and comparing the resulting differentiation value and a predetermined threshold value.

By differentiating the voltage, a voltage change can be recognized. Therefore, it is possible to detect an abrupt voltage change by differentiating the voltage and comparing the resulting differentiation value with a certain threshold value. For this reason, it is not necessary to define the power voltage accurately unlike Method 1. Even when the power voltage decreases due to a large load, a slow change of the power voltage can be neglected, and there is no trouble in operation.

Method 3: An arc discharge may be detected by differentiating the voltage twice and comparing the resulting secondary differentiation value with a predetermined threshold value.

Figure 6A:
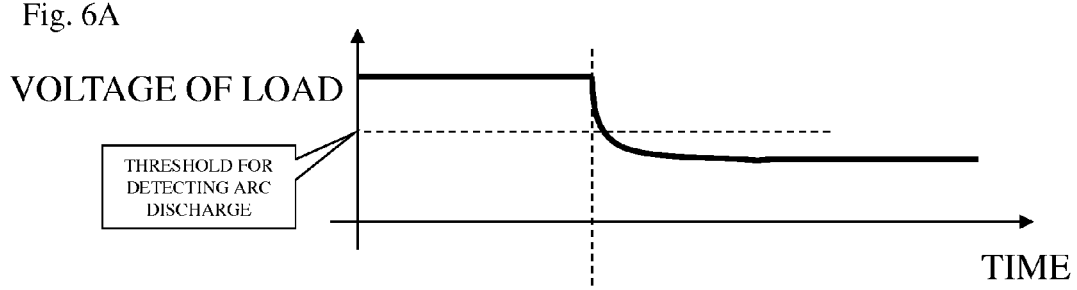
FIG. 6A is an explanatory diagram illustrating a current change in a load, generated by a voltage change caused by an arc discharge (by disconnecting the load)
Figure 6B:
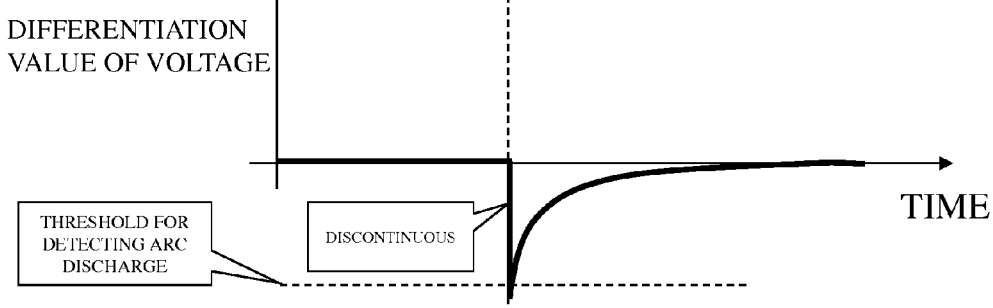
FIG. 6B is an explanatory diagram illustrating a voltage change in a load, generated by a voltage change caused by an arc discharge (by disconnecting the load)
Figure 6C:
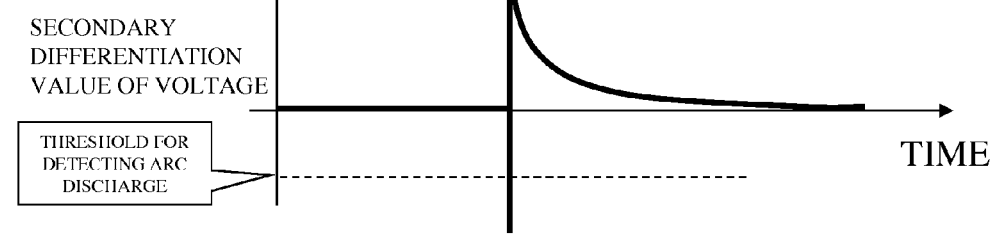
FIG. 6C is an explanatory diagram illustrating a change of a voltage differentiation value in a load, generated by a voltage change caused by an arc discharge (by disconnecting the load)
Figure 6D:
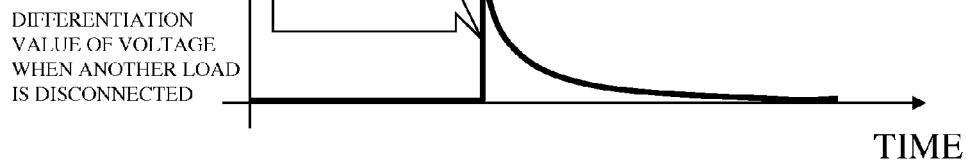
FIG. 6D is an explanatory diagram illustrating a change of a secondary voltage differentiation value of the load generated by a voltage change caused by an arc discharge (by disconnecting the load)

This is similar to Method 2. However, Method 3 is different from Method 2 in that the differentiation circuit 11 differentiates the voltage twice. When the voltage is differentiated twice, it can be expressed as illustrated in FIG. 6C. Therefore, it is possible to notably detect a voltage change.

A waveform of the voltage change other than an arc discharge (by adding a load) can be expressed as FIGS. 5A to 5D. A change of the waveform caused by an arc discharge is obviously different from those of FIGS. 6A to 6D. Therefore, it is recognized that Methods 1 to 3 can be effectively employed.

Figure 3B:
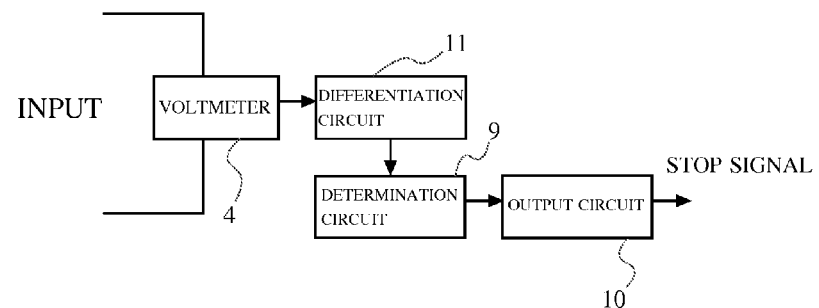
FIG. 3B illustrates a first exemplary configuration of an arc discharge detector unit (without a controller)

A determination circuit 9 of FIG. 3B is a part for comparison with a threshold value. The output circuit 10 outputs the comparison result by adjusting parameters such as a timing and an output pulse width to obtain a signal required by the power control unit 6.

These processes may be implemented by using a controller 12 such as a one-chip microcomputer. An exemplary configuration in this case is illustrated in FIG. 3C.

In this case, the voltage is converted into a digital value by using an AD converter, and processes such as detection of a voltage change or differentiation are performed through computation.

Alternatively, the power control unit 6 may be configured with a typical power supply circuit such as a switching circuit (PWM chopper (circuit)).

Figure 3C:
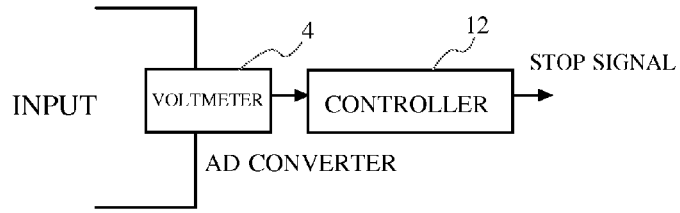
FIG. 3C illustrates a second exemplary configuration of the arc discharge detector unit (with a controller)
Figure 3D:
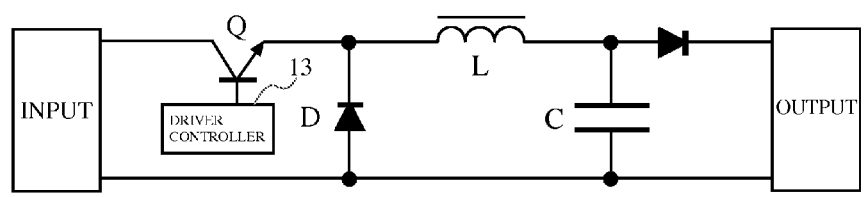
FIG. 3D illustrates an exemplary configuration of a power control unit.
Figure 3E:
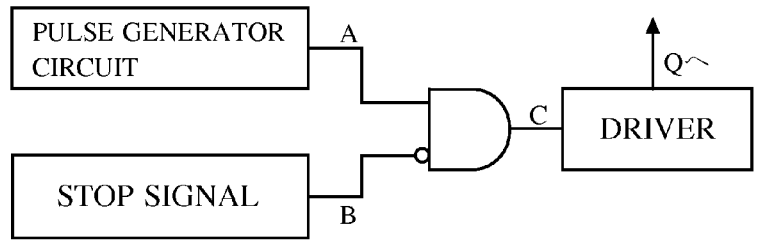
FIG. 3E illustrates an exemplary configuration of a driver/controller of FIG. 3D.
Figure 3F:
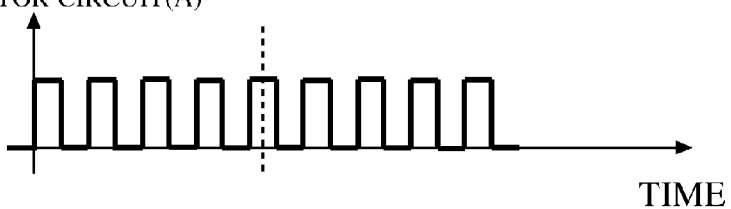
FIG. 3F is an explanatory diagram illustrating an output waveform of a pulse generator circuit of FIG. 3E.
Figure 3G:
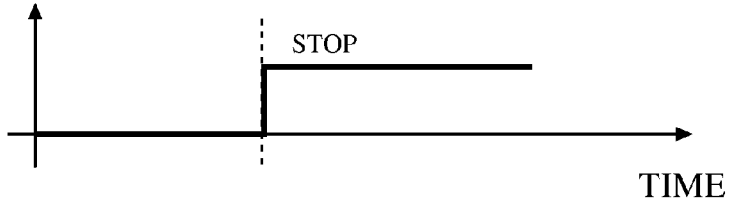
FIG. 3G illustrates an exemplary waveform of a stop signal in FIG. 3E.
Figure 3H:
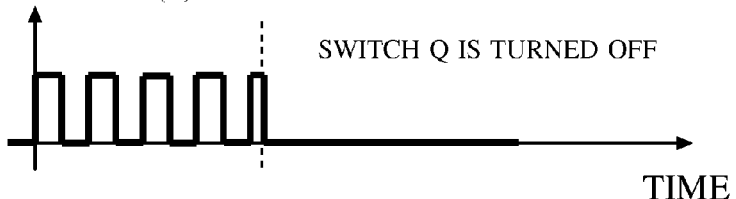
FIG. 3H is an explanatory diagram illustrating an output waveform input to the driver of FIG. 3E.

An exemplary configuration of this case is illustrated in FIG. 3D. In this case, the power supplied to the output is determined based on a pulse width output to a semiconductor switch Q from a driver/controller 13.

As the stop signal is received, by forcibly turning off the semiconductor switch Q, it is possible to cut off the current flowing to the load 2 (an example of this case is illustrated in FIGS. 3E to 3H).

Figure 3I:
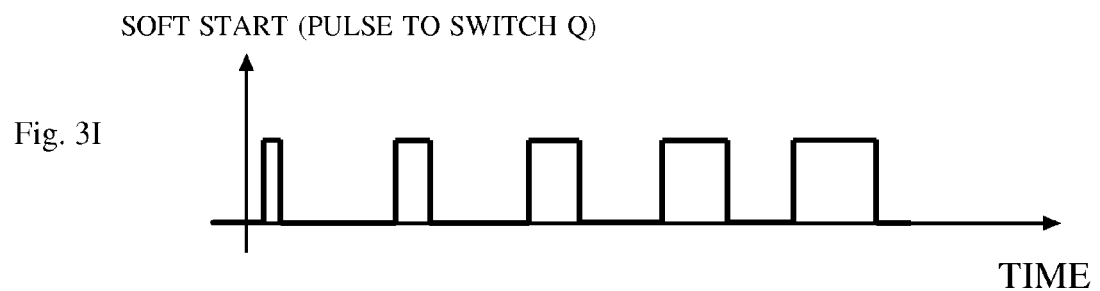
FIG. 3I is an explanatory diagram illustrating an exemplary output waveform input to the driver/controller when a soft start operation is performed in FIG. 3D.
Figure 3J:
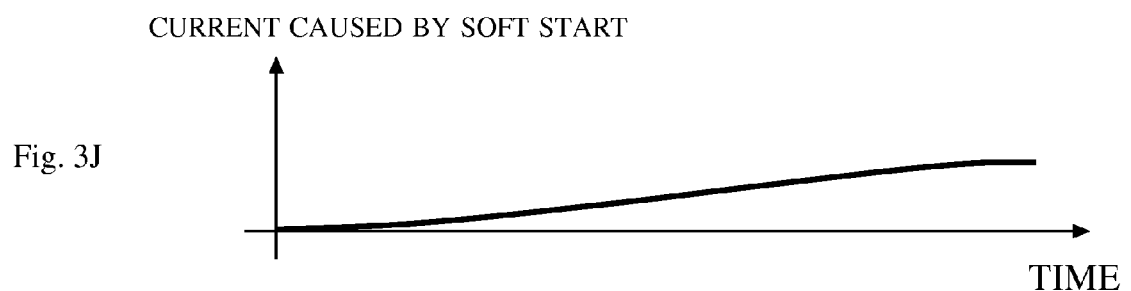
FIG. 3J is an explanatory diagram illustrating a waveform of an output current value when a soft start operation is performed in FIG. 3D.

Alternatively, when the soft start is implemented, the pulse width input to the semiconductor switch Q may be widened slowly (FIGS. 3I to 3J).

Currently, in most consumer electric devices, a power supply having a switching circuit such as the aforementioned semiconductor switch Q is employed. If such a switching circuit is provided, it is possible to provide the arc discharge prevention system according to this invention just by modifying several parts.

Figure 8:
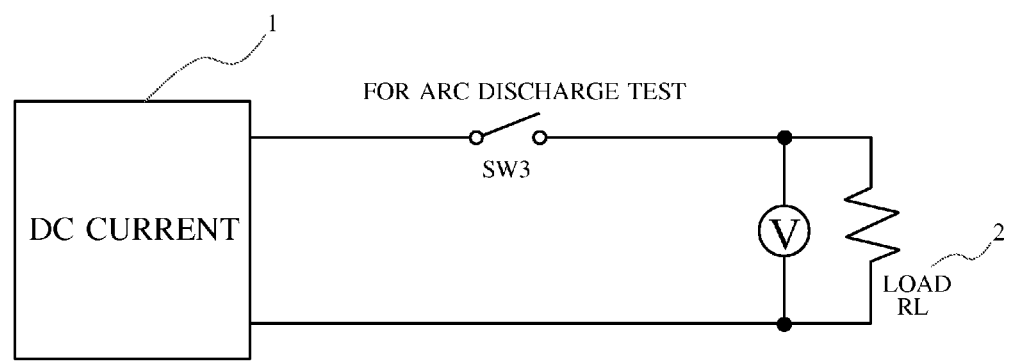
FIG. 8 is an explanatory diagram illustrating a circuit configuration when measurement is performed in FIG. 7.

Next, although the waveform of the voltage when an arc discharge is generated actually has been described above, a circuit configuration of this case will be described with reference to FIG. 8.

It is recognized that, as the DC power supply 1 is disconnected, a voltage seen from the load 2 side decreases abruptly. However, when an arc discharge is generated, the voltage does not decrease to zero perfectly, and an electric current still flows (refer to FIG. 7). When the discharge perfectly stops, the voltage also becomes zero.

Figure 9:
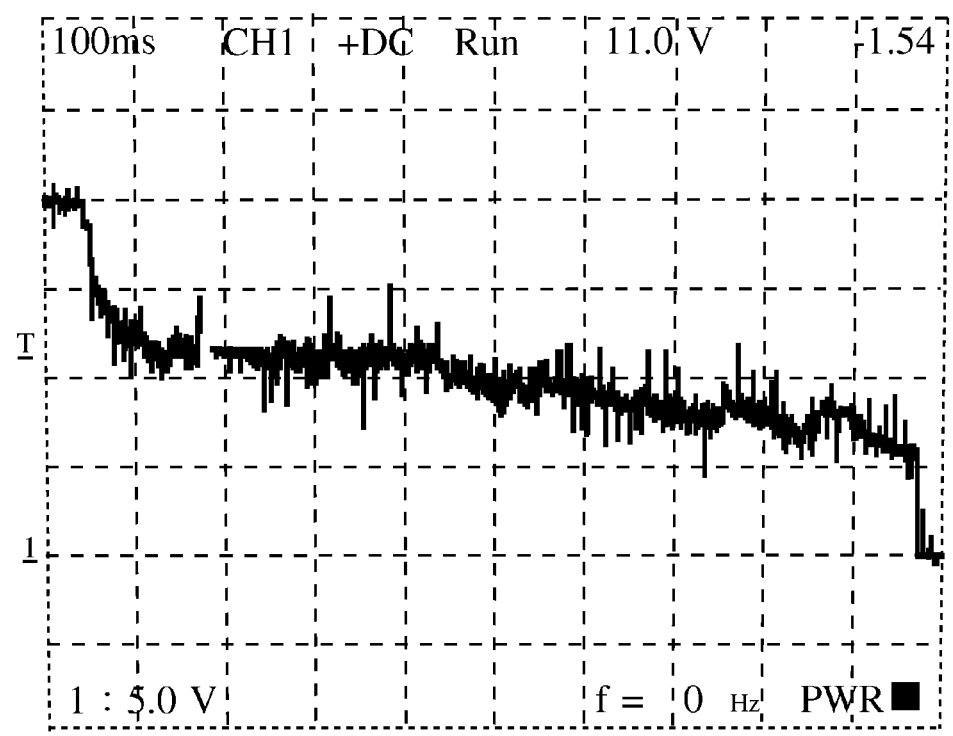
FIG. 9 is an explanatory diagram illustrating a voltage change in a load when an arc discharge is generated actually, and a switch is operated smoothly.

A waveform of the voltage when the switch is slowly manipulated is illustrated in FIG. 9. It is recognized that the discharge time increases more than that of FIG. 7, but the characteristic is similar.

It is possible to detect generation of an arc discharge as described above.

It is noted that, when an arc discharge is generated, it is difficult to stop this by using a mechanical switch. However, this can stop by using a semiconductor switch Q. Therefore, it is possible to stop an arc discharge by cutting off the load 2 by using a semiconductor switch Q employed in an inverter circuit of the prior art.

Next, a description will be made for a processing method when a controller 12 such as a one-chip microcomputer is employed as illustrated in FIG. 3C.

In order to check a differentiation value of the input voltage, the input voltage is measured by using a voltmeter 4 on a periodic basis. The (n)th measurement voltage is expressed as "$V_n$" (where "n" denotes any integer equal to or greater than zero), and the measurement interval is set as "t".

In other words, the voltage "$V_n$" means a voltage at "n×t" seconds.

A phenomenon of the "abrupt voltage decrease" means that the differentiation value is negative (decreasing voltage), and the differentiation value is equal to or greater than a certain value (through an abrupt change). That is, "$V_{n+1}-V_n$" becomes negative. Here, "$D_n$" is defined as "$D_n=V_{n+1}-V_n$." The value "$D_n$" corresponds to the differentiation of V.

When determination is made through primary differentiation, the processing may be performed by comparing this value and a predetermined threshold value.

Similarly, "$E_n$" is defined as "$E_n=D_{n+1}-D_n$." The value "$E_n$" corresponds to a secondary differentiation of V.

When determination is made through secondary differentiation, the processing may be performed as expressed in the following formulas by setting a certain threshold value and parameters "$A_1$" and "$A_2$":

$$D_n < A_1, \text{ and}$$

$$|D_{n+1}-D_n| > A_2.$$

When the two formulas are satisfied, it can be determined that an arc discharge is generated.

(Obtainment of Detection Power)

In order to detect and stop an arc discharge, it is necessary to normally operate the arc discharge detector unit 7 while an arc discharge is generated.

Meanwhile, when the voltage decreases as low as it is difficult to operate the arc discharge detector unit 7, the DC power supply 1 may be cut off immediately. By cutting off the DC power supply 1, it is possible to prevent an arc discharge.

This operation may be successful if a continuous arc discharge is prevented by dropping a voltage as low as a system does not stop. This operation may be performed by operating an arc discharge prevention unit 7 based on power of the arc discharge.

Meanwhile, in order to more reliably operate the arc discharge detector unit 7, electric power for the arc discharge detector unit 7 may be stored in a capacitor and the like.

(Sequence for Detecting Arc Discharge)

Figure 10:
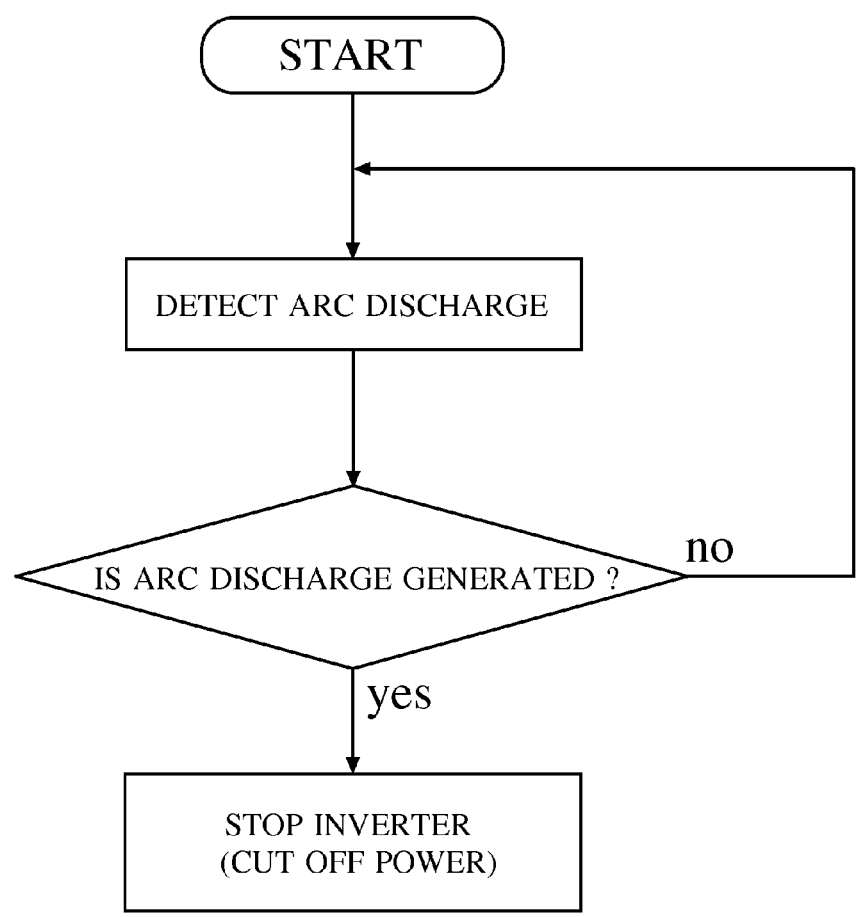
FIG. 10 is an explanatory diagram illustrating operations performed until an arc discharge is detected and stops.
Figure 11:
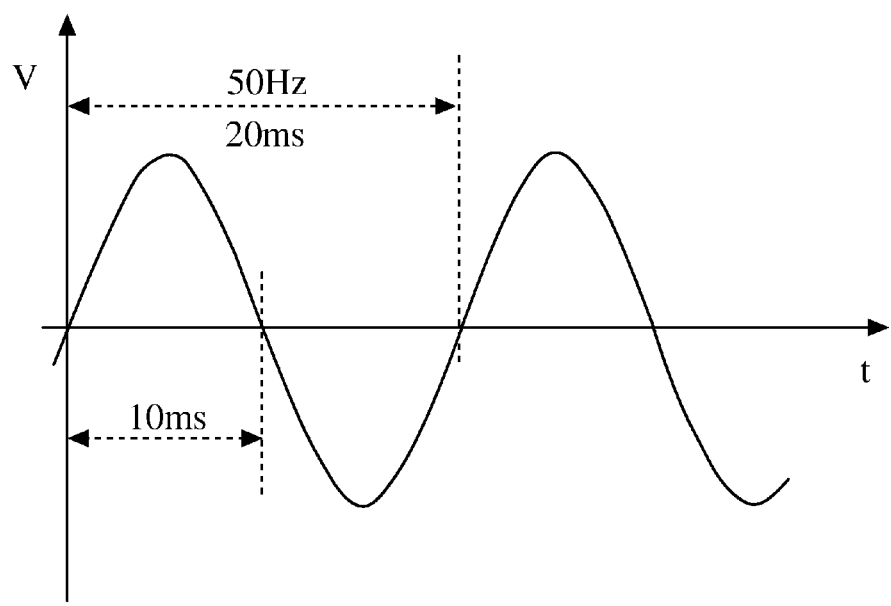
FIG. 11 is an explanatory diagram illustrating a case where an AC voltage changes to zero in the prior art.

Operations from arc discharge detection to arc discharge stop will be described with reference to FIG. 10.

As an arc discharge is detected, a stop signal is transmitted from the arc discharge detector unit 7 to stop the power control unit 6 to eliminate an arc discharge. It is noted that it is necessary to obtain power for detecting the arc discharge until the power control unit 6 perfectly stops (the capacity of the capacitor is determined on the basis of power for this time). Until power is turned on at the next time after the power control unit 6 stops, that is, until the power voltage reaches a certain level, the power control unit 6 remains in the stop state. After the power is turned on, a specified start operation is initiated by the soft-start control unit 8.

It is noted that, according to this invention, it is possible to safely use DC power by employing a structure as simple as a typical electric outlet or switch for power supply without a complicated electric outlet or switch having a special countermeasure.

In addition, it is possible to suppress an arc discharge generated in parts other than the electric outlet or the switch (for example, an arc discharge generated by electric disconnection).

It is noted that, if the load (device) has no inverter circuit, an arc discharge may be prevented by adding a separate inverter circuit and operating the inverter circuit by using an electric adapter.

By way of the inverter circuit, it is possible to prevent power consumption from uselessly increasing by a variation of the power voltage and widen an input voltage range of the power supply.

If the load 2 consumes less current and has few possibility of an abrupt decrease of the power voltage, the soft-start control unit 8 may not be necessary in some cases.

Alternatively, the soft start function may also be integrated into the power supply unit (such as a switching power supply). In this case, it is not necessary to separately provide the soft-start control unit 8.

If an inductor or the like is incorporated into an input part, it is possible to suppress an abrupt rise of the inrush current. In this case, the inductor or the like may serve as the soft-start control unit 8.

REFERENCE SIGNS AND NUMERALS

1 DC power supply
2 load
3 ammeter
4 voltmeter
5 switch
6 power control unit
7 arc discharge detector unit
8 soft-start control unit
9 determination circuit
10 output circuit
11 differentiation circuit
12 controller
13 driver/controller

The invention claimed is:

1. An arc discharge prevention system capable of preventing an arc discharge that may be generated in use of a DC power supply when power is supplied from the DC power supply to a DC load connected to the DC power supply to use DC power, the arc discharge prevention system comprising:

a power control unit provided between the DC power supply and the DC load to control a voltage of power supplied from the DC power supply to generate a voltage necessary in the DC load and transmit the voltage to the DC load, the power control unit having a chopper circuit provided with a semiconductor switch;

a soft-start control unit configured to perform control such that a current of the supplied power slowly increases in order to prevent the current from abruptly flowing to the DC load when the DC power supply is connected to the DC load, and configured to control an ON/OFF state of the semiconductor switch of the power control unit to output a soft start signal for increasing a current to the power control unit such that a current slowly flows to the DC load connected to the DC power supply; and an arc discharge detector unit provided between the DC power supply and the DC load to detect an abrupt voltage drop of the supplied power under a condition that a voltage drop generated by connecting the DC power supply to the DC load is alleviated by the soft-start control unit, regard the voltage drop as an arc discharge, and transmit, to the power control unit, a stop signal for disconnecting the DC power supply from the DC load, wherein the stop signal is generated based on differentiating between a voltage value of the supplied power and a first predetermined threshold value to perform a primary differentiation and determine a differentiation value, and differentiating between the differentiation value and a second predetermined threshold value to perform a secondary differentiation, and the arc discharge detector unit detects a change in voltage by differentiating between the voltage value of the supplied power and the first predetermined threshold value to determine the differentiation value, and differentiating between the differentiation value and the second predetermined threshold value to perform the secondary differentiation, and determines that an arc discharge is generated when a secondary differentiation value from the secondary differentiation exceeds a predetermined threshold value, and transmits the stop signal to turn off the semiconductor switch of the power control unit.

2. The arc discharge prevention system according to claim 1, wherein the arc discharge detector unit and the power control unit for cutting off supply power to the DC load are formed by using an inverter circuit provided with the semiconductor switch of the DC load.

3. The arc discharge prevention system according to claim 1, wherein the arc discharge detector unit and the power control unit for cutting off supply of power to the DC load are formed by providing a separate inverter circuit provided with a semiconductor switch if the DC load does not have an inverter circuit provided with a semiconductor switch.

* * * * *